E. J. OLESEN.
DEMOUNTABLE TABLE TOP.
APPLICATION FILED FEB. 21, 1917.
1,266,981.
Patented May 21, 1918.
2 SHEETS—SHEET 1.
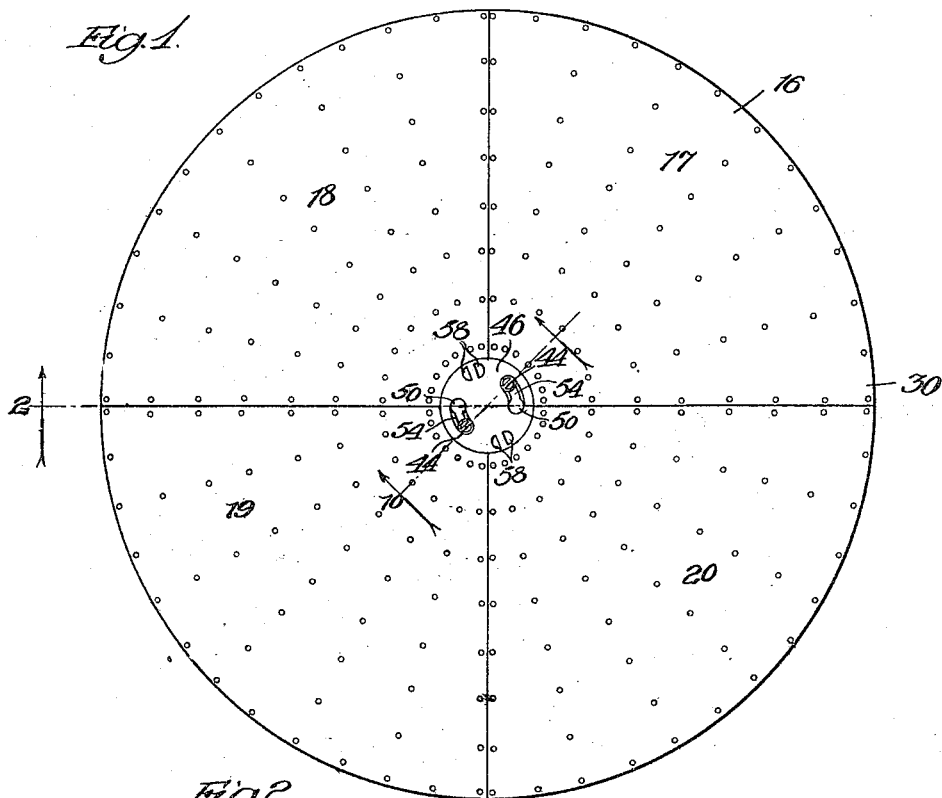
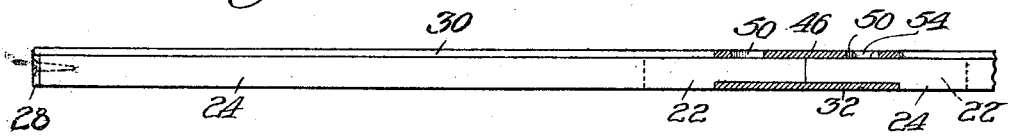
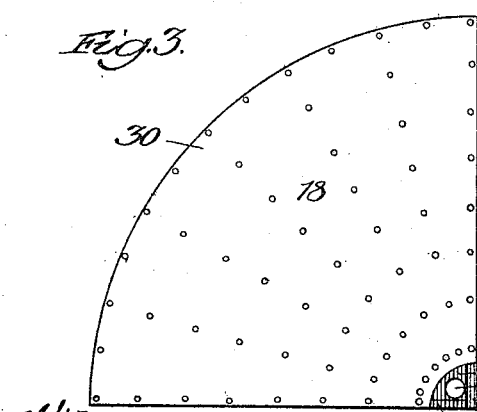
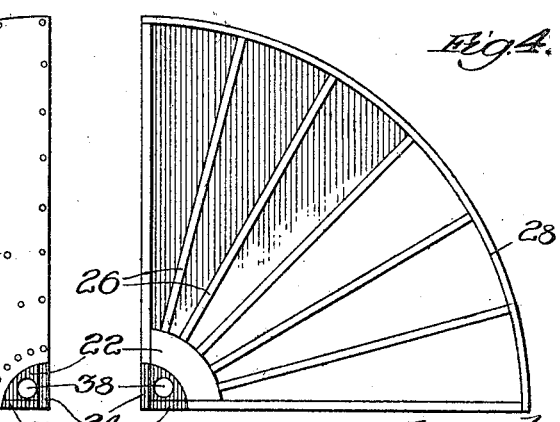
Witnesses:
Inventor:
Elisius J. Olesen,
By Cheever & Cox
Attys

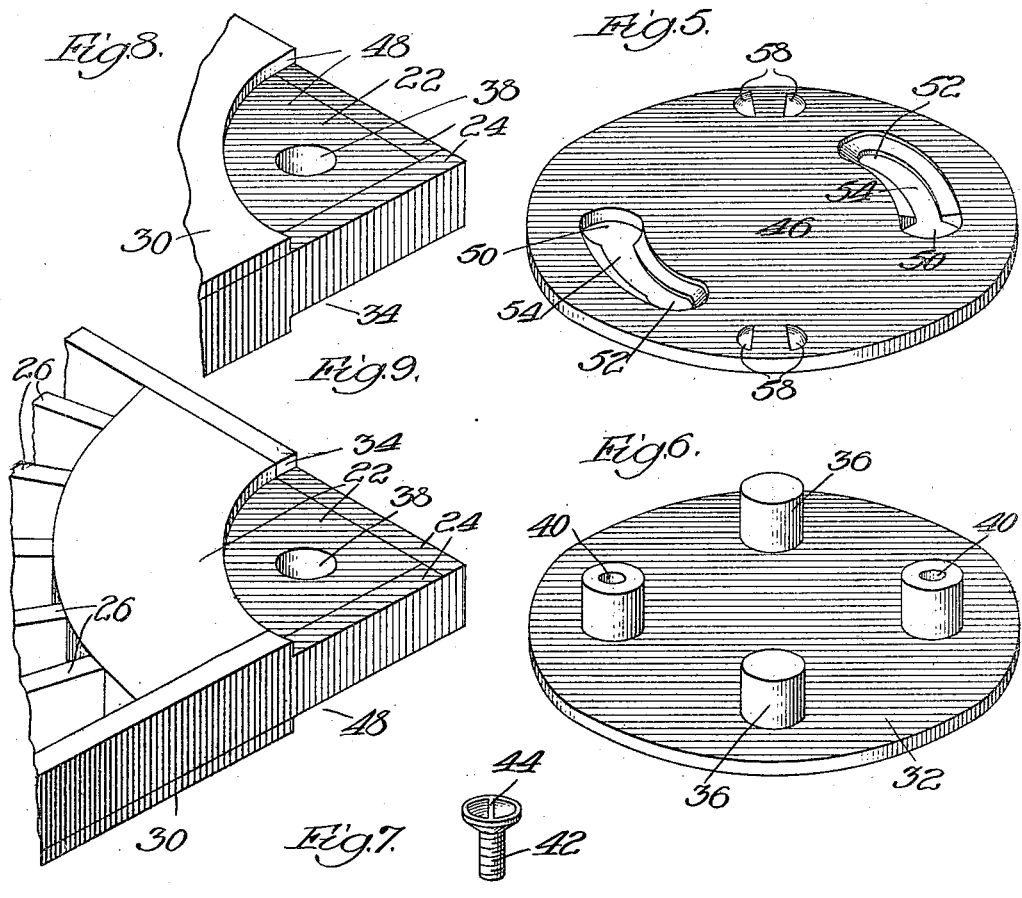

UNITED STATES PATENT OFFICE.

ELISIUS J. OLESEN, OF CHICAGO, ILLINOIS.

DEMOUNTABLE TABLE-TOP.

1,266,981.  Specification of Letters Patent.  Patented May 21, 1918.

Application filed February 21, 1917. Serial No. 150,023.

*To all whom it may concern:*

Be it known that I, ELISIUS J. OLESEN, a citizen of the United States, residing at Chicago, in the county of Cook and State of Illinois, have invented a certain new and useful Improvement in Demountable Table-Tops, of which the following is a specification.

This invention relates to tables. The object of the invention is to provide a plurality of relatively light and large sections which, when properly combined and locked together by mechanism constituting one part of this invention, form a complete and large table top which can be supported upon a very much smaller table or other suitable support. The invention is of special value for use in apartment buildings where space is at a premium, and a large table is only occasionally needed and would be in the way at other times were it not readily removable for storage.

The invention consists in a device capable of carrying out the foregoing objects; which can be easily and cheaply made; which is satisfactory in operation, and not readily liable to get out of order. The invention further consists in a novel form of structure for making the sections of a table very light, and in a novel form of a locking and securing device for fastening the sections of the table together. The invention further consists in the features and details of construction which will be hereafter more fully set forth in the specification and claims.

Referring to the drawings, in which similar numerals indicate the same parts throughout the several views, Figure 1 is a plan view of an assembled table top illustrating this invention in its preferred form.

Fig. 2 is an enlarged sectional view partially broken away, taken on the line 2, of Fig. 1.

Figs. 3 and 4 are respectively top and bottom plan views of one of the quarter sections of the table top.

Figs. 5 and 6 are enlarged perspective views of the top and bottom center plates of the locking or securing device.

Fig. 7 is a perspective view of one of the screws employed in holding the plates together in assembled position.

Figs. 8 and 9 are enlarged broken perspective views of the inner corner portion of one table section, showing respectively the upper and lower surfaces thereof, and the recesses therein within which the plates of Figs. 5 and 6 lie when the parts are assembled.

Fig. 10 is an enlarged sectional view taken on the line 10 of Fig. 1, showing the completely assembled table.

The particular table top shown in the drawings is circular in contour, bounded by the line 16 but other configurations may be used without departing from this invention. In the particular case shown in the drawing, the table top is divided into four sections 17, 18, 19 and 20, but a greater or less number of sections may be used without departing from this invention. The sections are all alike in construction. Their frame portions resemble, as shown, a wheel comprising a central block or hub 22, a plurality of radiating spokes 24—26, and a circumferential rim or tire 28, the members 24, just referred to, being when only four table sections are employed, side members and at right angles to each other as shown. This frame is made of light wood or other light strong material so that each section can readily be transported about a house or apartment by a child or a woman, and in furtherance of this object, the major portion of each section is covered with a sheet of very light pasteboard or strawboard 30 tacked or otherwise secured to the spokes or radial members as shown in the drawing.

The necessary table sections heretofore described being provided, the problem of detachably securing them together in a neat and convenient manner is presented, and is solved in this invention in the following manner:—

A lower plate 32, preferably made of metal is provided, adapted to lie in a recess 34 of suitable size and shape cut in the underside of member 22. Rising from this plate are a plurality of rigid lugs 36 corresponding in number to the number of table sections provided, each being adapted to fit into a hole or recess 38, provided in the block 22, as shown. Two or more of these lugs 36 are provided in their tops with screw threaded holes 40 adapted to receive special screws 42 having a preferably special designed hand-operated head 44. A second cover plate 46 is provided adapted to lie in a specially prepared recess 48 cut in the tops of the members 22 in the center of the table, and cover the holes 40 contained in the lugs 36. This cover 46 is provided over and adjacent to the points where the lugs 36 containing the holes 40 lie with openings through which the screws 42 may be inserted into the holes 40 to secure all the parts in assembled position, as shown in the drawing. The openings for these screws 42 may take any form, but preferably assume that shown in Fig. 5, in which the opening for each screw 42 constitutes a pair of adjacently arranged holes 50, 52 connected together by an elongated slot 54 concentrically arranged about the central axis of the table. These openings just described are shaped as shown in the drawings so that when the screws 42 are in opening 50, the plate 46 can be bodily removed over the screw heads, while the screw heads retain plate 46 in position when the screws are in slots 54 or in opening 52, the latter being countersunk as shown to receive the screw heads when the screws are tightened up. The passageways 54 are wide enough so that on rotating plate 46, the screws 42 slide through passage 54 from one hole 52 to the other hole 50. Finger holds 58 are provided in the top of plate 46.

The result of this construction is that when the screws 42 normally lying in openings 52, as shown in Fig. 10, are slightly loosened, the operator can take hold of the holds 58 on plate 46 and rotate the plate about the screws until they are in opening 50, whereupon he can remove plate 46. Having done this, the table sections can be lifted off from lugs 36 on plate 32 with resulting complete disassemblement of the device, this without removing the screws entirely from the holes 40 in lugs 36, thus obviating the danger of losing the screws when the parts are now moved away for storage. Assuming the parts are disassembled, except that screws 42 are loosely inserted in the holes 40, the operator places plate 32 in the center of the table or the like which is to support the collapsible table. He then places the table sections 17—20 in place, as shown in Fig. 1, as heretofore described. He then takes plate 46 and so places it that on lowering it into the recesses 34 of the table sections, the openings 50 will permit the plates passing the heads 44 of screws 40. He now rotates plate 46 until the openings 52 register with the screw heads, and then tightens down the screws, whereupon all of the parts are in the position shown in Fig. 10, and the table is ready for use.

Having thus described my invention, what I claim as new and desire to secure by Letters Patent, is:

1. In a device of the class described, a table top section comprising an angular block 22, radiating side members 24, intermediate radiating reinforcing members 26, an outside border member 28 passing across the outer ends of said radiating members and secured thereto, and a cover sheet 30 of very thin material suitably attached to the tops of the previously named parts.

2. A securing device for fastening a plurality of table top sections together comprising two parallel plates, lugs projecting upward from one of said plates toward the other adapted to engage table top sections, and detachable securing devices passing through the second plate into two or more of said lugs.

3. A locking device for table top sections comprising a plate adapted to be placed adjacent to the table top sections at their juncture, a plurality of lugs; one for each table top section to be secured in place arranged upon said plate, a second plate adapted to be placed over said lugs and in proximity thereto, screws passing through said second plate into engagement with one or more of said lugs, the openings through which said screws pass in the second plate being so arranged that when the screws are partially loosened from the lugs, the second plate may, by partial rotation be rendered removable from the screws while they are still attached to said lugs, the second plate being otherwise retained by said screws, for the purposes set forth.

4. In a device of the class described, a locking device comprising a pair of parallel plates, screws passing through one of the plates detachably securable to the second plate, said plate through which the screws pass being provided with elongated openings for said screws permitting rotation of the second plate between two different positions, and so shaped that in one extreme position the plate can be lifted off over the screw heads and in the other position it cannot.

5. A demountable table top comprising a plurality of table sections meeting at a common central point, a locking plate on one side of the table top provided with extending lugs, one of which enters a hole provided for the purpose in an adjacent one of the sections of the table top, a second plate upon the opposite side of the table top and opposite to the first plate, and securing devices passing through the second plate into two or more of the lugs in the first plate, for the purposes set forth.

6. A demountable table top comprising a plurality of table sections meeting at a common central point, a locking plate on one side of the table top provided with extending lugs, one of which enters a hole provided for the purpose in an adjacent one of the sections of the table top, a second plate upon the opposite side of the table top and opposite to the first plate, and securing devices passing through the second plate into two or more of the lugs in the first plate, the respective surfaces of the table top sections being recessed to receive the plates so as to provide smooth, parallel surfaces at the top and bottom of the finished table top.

In witness whereof, I have hereunto subscribed my name in the presence of two witnesses.

ELISIUS J. OLESEN.

Witnesses:
DWIGHT B. CHEEVER,
M. S. ROSENZWEIG.